UNITED STATES PATENT OFFICE 2,354,577

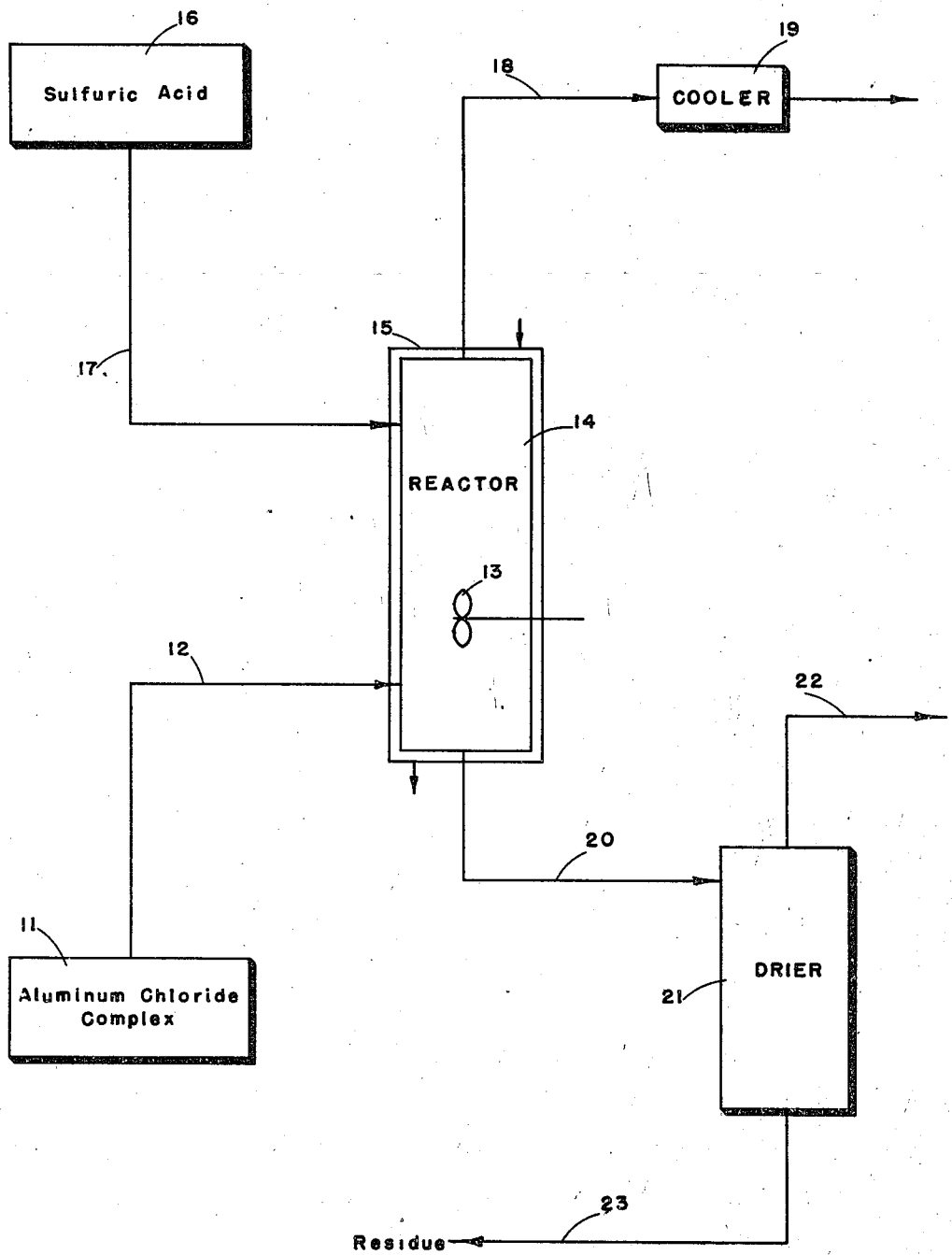

WETTING AGENT

John Hill Cone, Cedar Bayou, and Albert J. Shmidl, Houston, Tex., assignors to Standard Oil Development Company, a corporation of Delaware Application June 25, 1943, Serial No. 492,332

2 Claims. (Cl. 260—448)

The present invention is directed to the production of a wetting agent. More specifically, the present invention is directed to the production of a wetting agent particularly useful for increasing the adherence of asphalt to aggregate or similar paving materials.

The process for producing the present wetting agent may be described briefly as involving the reaction of sulfuric acid with aluminum chloride-hydrocarbon complex at a suitably maintained temperature until the reaction between the aforesaid ingredients is complete or substantially complete and the subsequent drying of the reaction product to produce an effective wetting agent.

A preferred method for producing the wetting agent of the present invention will now be described in greater detail in conjunction with the drawing, in which the sole figure is in the form of a diagrammatic flow sheet.

It will be understood that the expression "aluminum chloride-hydrocarbon complex" is used to designate the product produced by the reaction of aluminum chloride with hydrocarbons. It is one of the advantages of the present invention that the aluminum chloride-hydrocarbon complex used as a starting material herein may often be obtained as a waste product or by-product in refining processes. For example, aluminum chloride is often used in isomerization reactions at the present time and the aluminum chloride-hydrocarbon complex discarded from this process is a satisfactory initial starting material for producing the wetting material of the present application. Any suitable strength of sulfuric acid may be used to react with the aluminum chloride-hydrocarbon complex. The sulfuric acid may be either of the commercial grade or it may have been contaminated by previous use in industrial processes. For example, the sulfuric acid discarded as spent in the alkylation of petroleum hydrocarbons may be used in producing the product of the present invention.

Turning now specifically to the drawing, aluminum chloride-hydrocarbon complex is withdrawn from storage vessel 11 by line 12 into reaction vessel 14. The reaction vessel is provided with a suitable temperature regulating means such as a jacket 15 and with a stirring means 13. A heating fluid such as steam is circulated through the jacket of the vessel while the complex is stirred to heat the complex to a temperature, preferably, in the range of 275° F. to 325° F. After the aluminum chloride-hydrocarbon complex has been heated to the desired temperature, sulfuric acid is withdrawn from storage vessel 16 through line 17 and into the reaction vessel. The temperature of the fluids within the reaction vessel is maintained within the range of 275° F. to 325° F. by the circulation of a fluid of a suitable temperature in the jacket of vessel 14. The sulfuric acid is added at a relatively slow rate to prevent too vigorous action between the complex and the sulfuric acid. The contents of reaction vessel 14 are stirred, either continuously or intermittently, during the addition of the sulfuric acid to the vessel. Hydrogen chloride evolved in the vessel is removed through line 18 provided with cooler 19 and passed to a suitable storage means, not shown.

It is desirable that sufficient sulfuric acid be added to the complex in vessel 14 to react with all of the aluminum chloride present therein. The reaction may be indicated as having gone to completion when the overhead vapors are free from hydrogen chloride. After the reaction within vessel 14 has been found to be complete, the reaction product may be withdrawn via line 20 to dryer 21 and the remaining liquid removed through line 22 to leave a solid residue. The residue in dryer 21 is the desired wetting material and is indicated in the drawing as being removed from the dryer through conduit 23.

The following example is given herein to indicate the proportions which have been found useful in producing the complex and to show by comparison the satisfactory results which may be obtained when employing the material produced in accordance with these conditions to increase the adhesiveness of asphalt to aggregate. It is to be understood that the proportions employed and the physical conditions present in the reaction zone are not given by way of limitation, but only by way of illustration.

An aluminum chloride-hydrocarbon complex resulting in the isomerization of hydrocarbons suitable for aviation gasoline in the presence of aluminum chloride was employed as one of the starting materials. This complex was a dark red liquid with a specific gravity of 1.285 at 80° F. with a composition as follows:

Weight per cent oil ===================== =30.95
Weight per cent $Al^{+++}$ ================= =13.45
Weight per cent $Cl^-$ ==================== =51.80

Twenty-five parts by weight of the above described complex was placed in a reaction chamber and heated to 300° F., 22.7 parts by weight of 100 per cent equivalent sulfuric acid was added to the aluminum chloride-hydrocarbon complex in the reaction vessel over a period of one hour while the temperature of the reactants was maintained at approximately 300° F. The contents of the reaction vessel were agitated at 10-minute intervals during the interval that the sulfuric acid was added thereto. After all of the acid had been added to the reaction vessel the overhead vapors were tested and found to be free from HCl. Accordingly the contents of the reaction zone were transferred to a dryer and reduced to a solid. Approximately 37 parts of easily pulverized material was present as a residue in the dryer. This residue was used as a wetting agent in coating aggregate with asphalt without additional treatment or purification.

In the following table the results obtained when using the residue as the wetting agent in coating gravel with asphalt (run 4) are compared with the results obtained when using commonly accepted procedures (runs 1 to 3) for coating aggregate with asphalt. The improved coating resulting when employing the residue of the present invention is readily apparent by the comparison of the more satisfactory results of run 4, wherein the residue was used as the wetting agent, with the remaining runs.

After the one-minute mixing period, the per cent of the aggregate surface which was coated with asphalt was visually estimated and the estimate set down as the adhesiveness of the initial coating. To demonstrate the resistance of the coated mixture to subsequent displacement by water, the aggregate mixed as above described was spread out on a tin can cover and allowed to cure at room temperature. At the end of each curing period approximately one-half of the coated aggregate was placed in a beaker and covered with distilled water at room temperature. After the aggregate had been immersed for the given period of time a visual estimation was made of the percentage of the surface retaining the asphalt coating.

Having fully described and illustrated the practice of the present invention, what we desire to claim is:

1. A method for producing a material having wetting characteristics comprising the steps of reacting aluminum chloride-hydrocarbon complex with sulfuric acid at a temperature in the range of 275° F. to 325° F. and subsequently drying the products of said reaction.

2. A method for producing a material having

|  |  | Run | | | |
|---|---|---|---|---|---|
|  |  | 1 | 2 | 3 | 4 |
| Gravel | parts | 200 | 200 | 200 | 200. |
| Asphalt | do | 12.0 | 12.0 | 12.0 | 12.0. |
| Soap | type | None | Ordinary | Sodium sulphonate | Sodium sulphonate. |
| Soap | parts | do | 2.0 | 2.0 | 2.0. |
| Wetting agent | type | do | Aluminum sulphate | Aluminum sulphate | Sulfuric acid reacted aluminum chloride residue. |
| Wetting agent | parts | do | 0.4 | 0.4 | 0.4. |
| Water | do | 2.0 | 2.0 | 2.0 | 2.0. |
| Adhesiveness: |  |  |  |  |  |
| Initial coating |  | 80 | 100 | 100 | 100. |
| 0 hours curing and 1 hour immersion in water |  | 5 | 25 | 50 | 100. |
| 1 hour curing and 1 hour immersion in water |  | 10 | 90 | 88 | 100. |
| 1 hour curing and 4 hours immersion in water |  | 10 | 85 | 80 | 95. |
| 20 hours curing and 4 hours immersion in water |  | 80 | 100 | 100 | 100. |

The following procedure was used in conducting the tests listed in the preceding table:

200 grams of aggregate (¼-inch to ½-inch sieve size) was placed in a container and the required amount of water, either containing soap or not in accordance with the test, was admixed therewith. Six per cent by weight of the total cutback asphalt used was then poured on the aggregate and vigorously mixed therewith for a period of one minute.

wetting characteristics comprising the steps of adding sulfuric acid to an aluminum chloride-hydrocarbon complex at a temperature of approximately 300° F. and continuing the addition until no HCl is present in the vapors removed from said reactants, and subsequently drying said reactants to obtain a solid product.

JOHN HILL CONE.
ALBERT J. SHMIDL.